United States Patent [19]

Tordjeman

[11] Patent Number: 5,429,181
[45] Date of Patent: Jul. 4, 1995

[54] FASTENING DEVICE FOR A HEAT EXCHANGER HAVING A TUBULAR HEADER

[75] Inventor: Jean-Michel Tordjeman, Elancourt, France

[73] Assignee: Valeo Thermique Moteur, Le Mesnil-Saint Denis, France

[21] Appl. No.: 46,447

[22] Filed: Apr. 13, 1993

[30] Foreign Application Priority Data

Apr. 16, 1992 [FR] France ................ 9204709

[51] Int. Cl.$^6$ ............................................. F28F 9/00
[52] U.S. Cl. .................................. 165/67; 180/68.4; 248/232
[58] Field of Search .................. 165/67; 180/68.4; 248/232

[56] References Cited

U.S. PATENT DOCUMENTS

| | | | |
|---|---|---|---|
| 1,737,057 | 11/1929 | Muir | 180/68.4 |
| 1,863,820 | 6/1932 | Wolfe | 248/232 |
| 4,564,168 | 1/1986 | Ikuta et al. | 248/638 |
| 4,651,816 | 3/1987 | Struss et al. | 180/68.4 X |
| 5,069,275 | 12/1991 | Suzuki et al. | 165/67 |
| 5,183,103 | 2/1993 | Tokutake | 165/67 |

FOREIGN PATENT DOCUMENTS

| | | | |
|---|---|---|---|
| 0132844 | 2/1985 | European Pat. Off. | |
| 1228929 | 9/1960 | France | 248/232 |
| 1067578 | 10/1969 | Germany | 248/232 |
| 0070994 | 3/1991 | Japan | 165/67 |
| 0164694 | 7/1991 | Japan | 165/67 |
| 2223091 | 3/1990 | United Kingdom | |

*Primary Examiner*—John Rivell
*Attorney, Agent, or Firm*—Morgan & Finnegan

[57] ABSTRACT

A heat exchanger assembly comprises a heat exchanger, having a tubular header, and a support member to which the heat exchanger is secured by a fastening device. The heat exchanger is typically a condenser of a motor vehicle air conditioning system. The fastening device comprises a first fastening element having a concave central portion, at least one retaining lug and an extension which is provided with gripping means; a second fastening element having a concave central portion, a retaining lug having at least one aperture for receiving the retaining lug of the first fastening element, and an extension having further gripping means which cooperate with the gripping means of the first fastening element; and a fastening lug which is integral with either the first or second fastening element and which is adapted to be fastened to the support member.

11 Claims, 3 Drawing Sheets

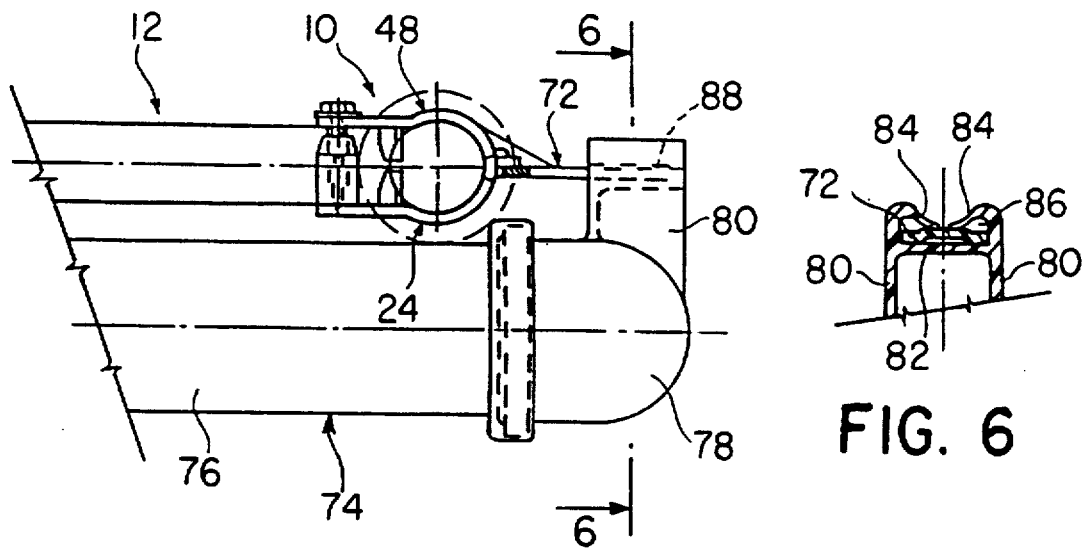
FIG. 5
FIG. 6
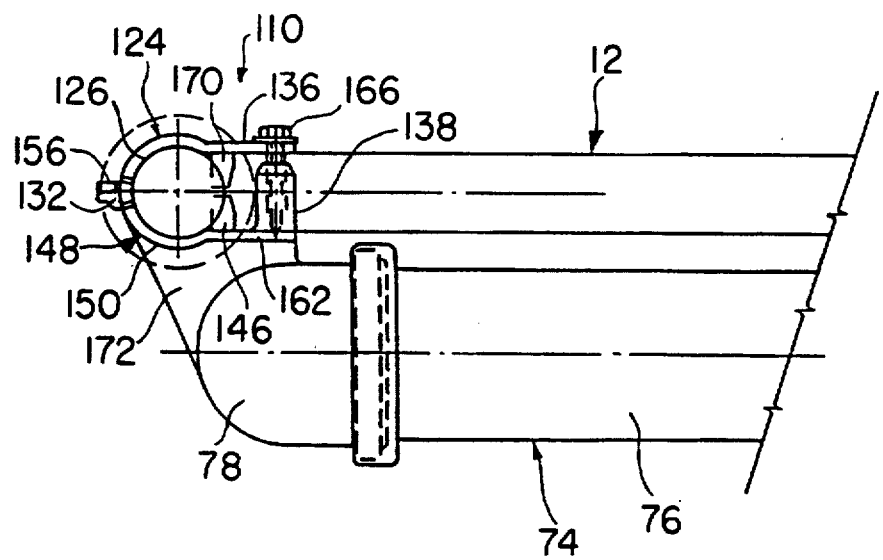
FIG. 7

FASTENING DEVICE FOR A HEAT EXCHANGER HAVING A TUBULAR HEADER

FIELD OF THE INVENTION

This invention relates to heat exchangers of the kind comprising at least one tubular header carried on a bundle of tubes, and more particularly to a heat exchanger assembly comprising such a heat exchanger together with a support member and a fastening device by which the heat exchanger is fastened to the support member. The invention is directed essentially to such a fastening device.

BACKGROUND OF THE INVENTION

A heat exchanger comprising a tube bundle and at least one tubular header, of the kind mentioned above, may typically be used as a condenser arranged to form part of an air conditioning installation for a motor vehicle. A refrigerant fluid flows through the condenser; and such a condenser is provided with corrugated spacers which define cooling fins between the tubes. The tubes are brazed to one or more headers. In this connection the tubes may have a hairpin or double pass configuration, so that they are connected to a single header; alternatively the tubes may be straight, with the heat exchanger then having two headers, one at each end of the tube bundle.

The support member in the assembly may for example be part of the bodywork of the motor vehicle. Alternatively it may be part of some piece of equipment, which may for example be another heat exchanger.

It is known to fasten the condenser of an air conditioning installation on to another heat exchanger, for example the cooling radiator of the engine of the vehicle, in such a way that a common airstream can flow in succession through the engine cooling radiator and the condenser.

It is known from the specification of Japanese patent No. 64-38481 to secure a heat exchanger of the kind described above by means of U-shaped collars, in either one or two parts, which are nested around a tubular header of the heat exchanger, to which they are secured by means of fixing screws. A disadvantage of this arrangement is that the structure of the tube bundle has to be modified, and the assembly operations are complicated.

It is also known from the specification of European patent application EP 0 440 400 to provide fastening lugs which are welded on to the tubular header. This arrangement is again unsatisfactory, given that in the event of rupture of one of the fastening lugs, the whole assembly comprising the heat exchanger and its fastening lugs has to be replaced.

DISCUSSION OF THE INVENTION

A main object of the invention is to overcome the drawbacks mentioned above.

According to the invention, a fastening device, for securing on a support member a heat exchanger of the kind comprising at least one tubular header and a bundle of tubes, is characterised in that it comprises:

a first fastening element having a concave central portion which is adapted to fit against a peripheral region of the header by means of a retaining lug which is arranged at one end of the said central portion, and an extension which is arranged at another end of the said central portion and which carries gripping means;

a second fastening element having a concave central portion which is adapted to fit against an opposite peripheral region of the header, a retaining lug which is arranged at one end of the said central portion and which has at least one aperture for receiving the retaining lug of the said first fastening element, and an extension which is arranged at another end of the said central portion and which carries gripping means adapted to cooperate with the gripping means of the first fastening element, so as to bring the respective extensions of the first and second fastening elements together; and a fastening lug which is formed integrally with the first fastening element and/or the second fastening element, and which is adapted to be joined to the said support member.

Such a device is easily fitted on the header without necessitating any significant modifications to the tube bundle. It can also be easily removed, for the purpose of replacing either the fastening device itself or the heat exchanger.

In one form of the invention, the fastening lug is an extension of the retaining lug of the second fastening element.

The fastening lug may also consist of a tongue which is arranged to be force-fitted into a space or recess defined by the support member, the latter being for example a header of another heat exchanger. In a modification, the fastening lug is in the form of a cranked tongue having a hole for fixing the tongue on to the said support member by means of a screw and nut assembly. The support member here may for example be a cross member of another heat exchanger.

In another form of the invention, the fastening lug is attached to the said central portion and to the extension of the second fastening element. In this embodiment the fastening lug may for example be made integral with the header of another heat exchanger.

In the various embodiments of the invention mentioned above, according to a preferred feature of the invention the said gripping means comprise at least one boss, depending from an extension of the said first or second fastening element and having a coaxial hole, together with a screw extending through the extension of the second or first fastening element so as to engage in the axial hole of the corresponding boss. This screw, which may in particular be of the self-tapping kind, thus enables the two extensions to be pulled towards each other, so that the fastening device is gripped around the header in the manner of a collar. The boss is preferably so designed that it can be inserted into the space defined between two adjacent tubes of the tube bundle.

Preferably, the respective extensions of the first and second fastening elements include, on their surfaces which are in facing relationship with each other, at least one projecting abutment which can be introduced between two adjacent tubes of the heat exchanger.

These projecting abutments improve the immobilisation of the fastening device around the header.

In a further embodiment of the invention, the extension of the first fastening element comprises a double-bent, or U-shaped, lug which is provided with a nut and which is adapted to fit over a projecting flange of the said support member, and in that the extension of the second fastening element is bent so as to define a cranked lug adapted to be applied against the double-bent lug, the said gripping means including a screw arranged to extend sucessively through the cranked lug and the double-bent lug and to cooperate with the said nut. This last mentioned embodiment of the invention is especially suitable for fastening the heat exchanger on a cross member of another heat exchanger. In this arrangement, the gripping means (i.e. the screw and the nut) bring the first and second fastening elements together in the manner of a collar and also secure them on to the support member, which is in this case of course the cross member of the said other heat exchanger.

In the description of preferred embodiments of the invention which follows, and which is given by way of example only, reference is made to the accompanying drawings.

BRIEF DESCRIPTION OF THE DRAWINGS

FIG. 5 is an end view showing a modified version of the arrangement shown in FIG. 1, applied to the fastening of the heat exchanger on to another heat exchanger.

FIG. 6 is a scrap view, seen in cross section on the line VI—VI in FIG. 5.

FIG. 7 is an end view showing a fastening device in a further embodiment according to the invention, applied to the fastening of a heat exchanger, having a tubular header, on to another heat exchanger.

DESCRIPTION OF PREFERRED EMBODIMENTS OF THE INVENTION

Figure 1:
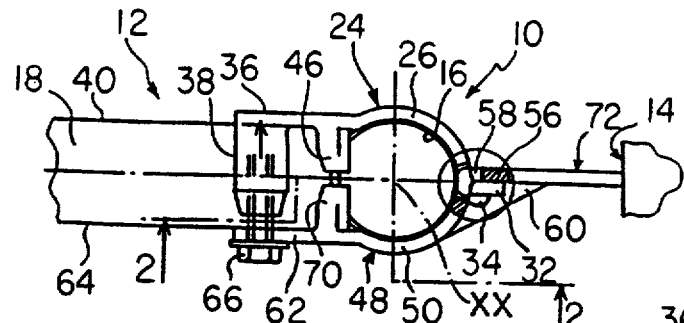
FIG. 1 is an end view, shown in partial cross section, of a fastening device in a first embodiment of the invention, mounted on a header of a heat exchanger having flat tubes.
Figure 2:
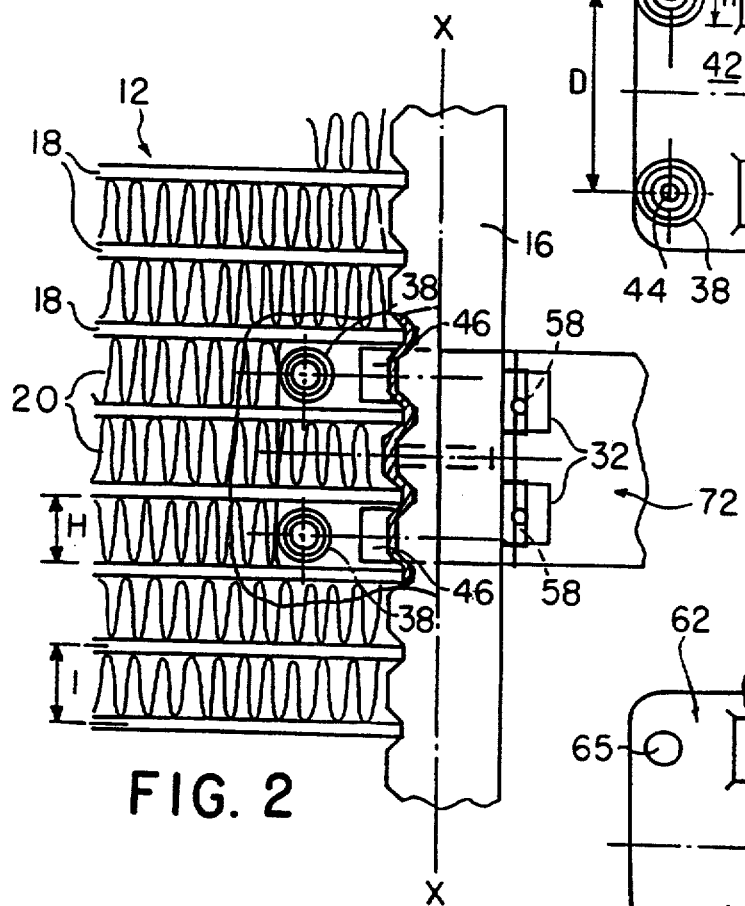
FIG. 2 is a side view of the same fastening device, shown partly in cross section taken on the line II—II in FIG. 1.
Figure 4:
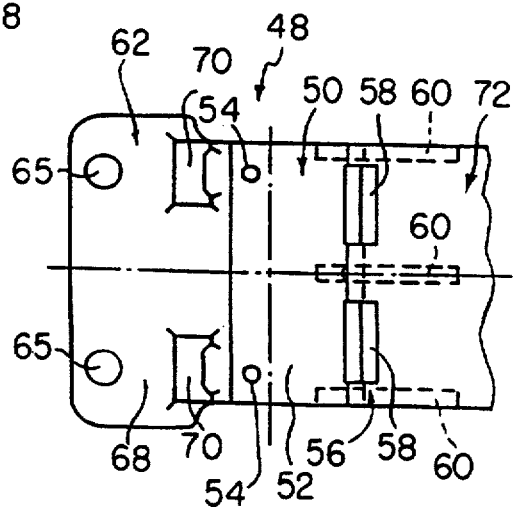
FIG. 4 is a view in elevation on a larger scale, of the second fastening element of the arrangement in FIG. 1.

Reference will first be made to FIGS. 1 and 2, which show a device 10 for fastening a heat exchanger 12 on to a support member 14. The heat exchanger 12 comprises at least one tubular header 16, defining an axis XX, together with a bundle of flat tubes 18, between which there are arranged corrugated spacers 20 which act as cooling fins. The tubes 18 have a flattened, straight cross section, and are introduced into oblong slots of corresponding shape which are formed in the wall of the header 16. The various components are brazed together to form this assembly. The tubes 18 may be either U-tubes, in which case the heat exchanger has only one header 16, or single pass straight tubes mounted between two headers which are arranged at the two ends of the tube bundle. Such a heat exchanger is generally used as a condenser, for which purpose a refrigerant fluid, typically for the purpose of air conditioning of the cabin of a motor vehicle, is passed through it.

Figure 3:
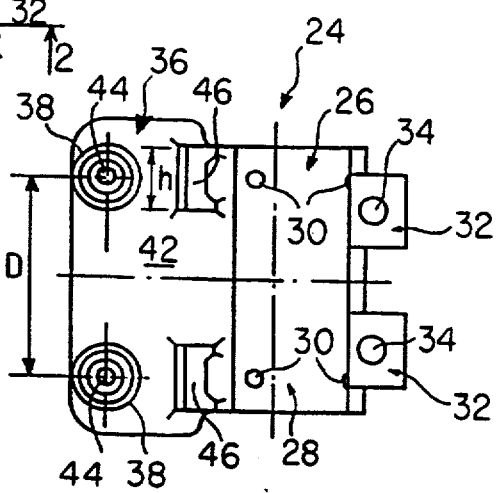
FIG. 3 is a view in elevation on a larger scale, showing the first fastening element of the arrangement in FIG. 1.

The fastening device 10 comprises a first fastening element 24 (FIGS. 1 to 3), which has a concave central portion 26 which is so shaped as to fit against a peripheral region of the header 16. In this example, the portion 16 is arranged to surround the header over an arc of a circle corresponding approximately to one third of its circumference. The central portion 26 has a concave inner face 28 (FIG. 3), on which four projecting bosses 30 are formed, and each of these bosses is in the form of a spherical pip; the bosses 30 are so disposed as to engage against the wall of the header 16.

The fastening element 24 also has two retaining lugs 32 which are arranged at one end of the central portion 26. These lugs 32 are bent back so that they extend in a substantially radial direction with reference to the axis XX when the fastening element 24 is engaged against the header as shown in FIG. 1. Each lug 32 has a retaining boss 34 (FIGS. 1 and 3), the purpose of which will be explained below.

The fastening element 24 further includes an extension 36 which is arranged at the other end of the central portion 26, and which carries two further bosses 38 to act as gripping means. The extension 36 extends in a plane substantially parallel to that of the retaining lugs 32, so that it can engage against a longitudinal side 40 of the bundle of tubes 18. The gripping bosses 38 project from an inner face 42 (see FIG. 3) of the fastening element 24, with each boss 38 being formed with an axial hole 44. The gripping bosses 38 are so dimensioned that each one can be interposed between two adjacent tubes 18 of the bundle, as is shown in FIG. 2. In this example, the respective axes of the gripping bosses 38 are spaced apart by a distance D (FIG. 3) which corresponds to twice the gap I shown in FIG. 2 and separating two consecutive tubes 18.

The extension 36 is also provided on its inner face 42 with two projecting abutments 46 (FIGS. 1 to 3), which are,spaced apart by the same distance D. Each of these abutments 46 is arranged to be introduced between two consecutive tubes 18 of the heat exchanger, while bearing against the wall of the header 16. Each of the abutments 46 extends over a height h, which is smaller than the height H of the spacers 20 (see FIG. 2).

The fastening device also includes a second fastening element 48, which has a concave central portion 50 so shaped as to fit against an opposite peripheral region of the header 16, as can be seen in FIG. 1. The central portion 15 has a shape which is generally cylindrical, like that of the concave central portion 26 of the first fastening element 24. It has an inner face 52 on which two bosses 54 are formed, again having the shape of spherical pips and with the same function as the bosses 30 described above. The fastening element 48 also includes a retaining lug 56, which is arranged at one end of its central portion 50 and which is formed with two slots 58, spaced away from each other and formed in the junction zone between the central portion 50 and the retaining lug 56. Each of these two slots 58 is arranged to receive a respective one of the two retaining lugs 32 of the fastening element 24, so that the retaining bosses 34 resist separation of the two fastening elements 24 and 48 from each other.

The retaining lug 56 extends in a direction which is substantially radial with respect to the axis XX of the header 16 when the fastening device is mounted on the heat exchanger as shown in FIG. 1. In addition, three generally triangular ribs 60 join the central portion 50 of the fastening element 48 to its retaining lug 56. The fastening element 48 further includes an extension 62 which is arranged at the other end of its central portion 50, and which extends parallel to the extension 36 in the assembled position shown in FIG. 1. In this position, the extension 62 engages against the longitudinal side 64 of the tube bundle which is opposite to the side 40 of the latter. Two holes 65 are formed through the thickness of the extension 62. These holes 65 are spaced apart by the same distance D, and are in facing relationship to the holes 44 formed in the gripping bosses 38. The holes 65 are arranged to receive a respective one of two screws 66, for example self-tapping screws, which engage in the respective holes 44 of the gripping bosses 38. In addition, the extension element 62 has an inner face 68 which has two projecting abutments 70. Each of these abutments 70 forms a pair with a corresponding one of the abutments 46 of the first fastening element 24.

In order to permit fitting of the fastening elements 24 and 48 around the header 16, two free spaces are provided so as to accommodate the bosses 38 and the abutments 46 and 70. These spaces are formed by interrupting the corrugated spacers 20, as can be seen in FIG. 2. Progressive tightening of the screws 66 clamps the fastening device 10 firmly on the heat exchanger, without any possibility of movement.

It will be noticed that the fastening device also includes a securing lug 72. In this example this lug 72 is an extension of the retaining lug 56. The fastening lug 72 is integral with the second fastening element 48, and it can be secured on the support member 14 in any appropriate way. The fastening elements 24 and 48 are preferably made by moulding in a suitable plastics material.

Referring now to FIGS. 5 and 6 showing a second embodiment of the invention, the heat exchanger 12, which is a condenser in this example, is arranged to be secured on to another heat exchanger 74. This latter may typically be a cooling radiator. The two heat exchangers are fastened to each other by means of a fastening device 10 similar to that described above with reference to FIGS. 1 to 4.

The heat exchanger 74 includes a tube bundle 72 which is joined to at least one header 78. In this example, the latter is of a suitable plastics material, and has two parallel lugs 80 which are spaced apart and which are joined together by means of a transverse element 82. The lugs 80 have two upset edge portions 84 which extend resiliently towards the transverse element 82, so as to define a space 86 in which the fastening lug 72 of the fastening device 10 is received. In this example, the fastening lug 72 is in the shape of an elongated tongue having a cross section with an offset central portion. This tongue has transverse dimples 88 (FIG. 5), in which the edge portions 84 are received so as to retain the fastening device 10 in its required position.

Reference is now made to FIG. 7, which shows a third embodiment of the invention for securing the heat exchanger 12 on to another heat exchanger 84. In this embodiment, those elements which are common with those in any of FIGS. 1 to 6 are indicated by the same reference numerals but increased by 100.

In FIG. 7, the fastening device 110 has a fastening lug 172 which is attached to the central portion 150 and the extension 162 of the second fastening element 148. The fastening lug 172 is, in this example, made integral with the header 78 of the heat exchanger 74. The second fastening element 148 is integral with the header 78, this monobloc assembly being preferably made by moulding in a suitable plastics material. In this embodiment, the retaining lug 156 extends over a short length which is approximately the same as that of the retaining lugs 132 of the first fastening element 124. The gripping boss 138 is here part of the second fastening element 148.

Figure 8:
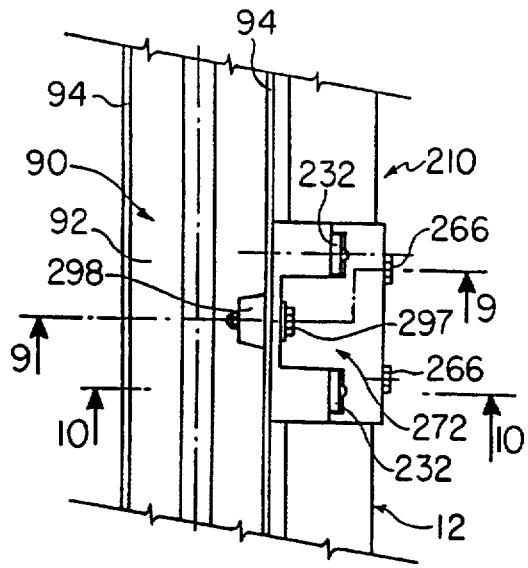
FIG. 8 is a top plan view showing part of a fastening device in accordance with the invention, in another embodiment in which it is adapted for fastening a heat exchanger with a tubular header on to a cross member of another heat exchanger.
Figure 9:
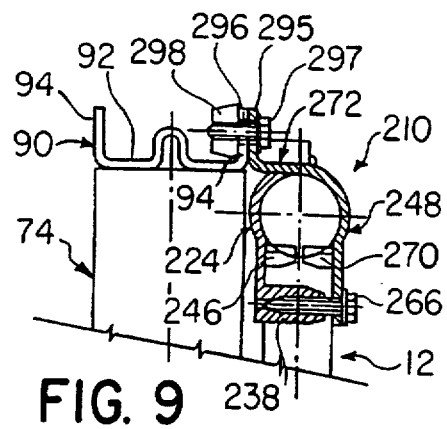
FIG. 9 is a view in cross section taken on the line IX—IX in FIG. 8.
Figure 10:
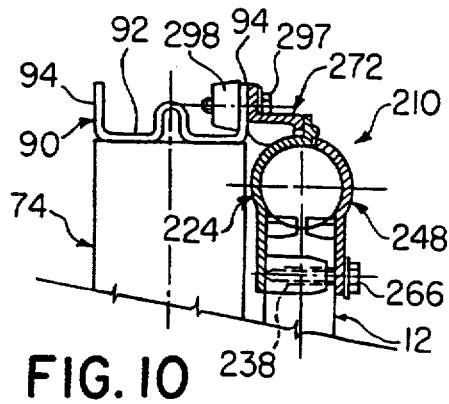
FIG. 10 is a view in cross section taken on the line X—X in FIG. 8.

Reference will now be made to FIGS. 8 to 10, showing a fourth embodiment of the invention, in which a heat exchanger 12 is again secured on to another heat exchanger 74. The heat exchanger 12 in this embodiment is fixed on a cross member 90 of the heat exchanger 74. The transverse cross section of this member 74 is U-shaped, defining a base portion 92 and two projecting flanges 94.

Those elements in FIGS. 8 to 10 which are common with those in FIGS. 1 to 4 are designated by the same reference numerals increased by 200.

The heat exchanger 12 is secured by means of at least one fastening device 210 which is fixed on to one of the flanges 94 of the cross member 90. In this example, the first fastening element 224 is similar to the fastening element 24, while the second fastening element 248 has a fastening lug 272 in the form of a cranked tongue, which is accordingly bent at right angles and which has a hole 295. The hole 295 is arranged to be aligned with another hole 296, which is formed in one of the flanges 94. The fastening lug 272 is fixed to the flange 94 by means of a screw 297, which passes through the holes 295 and 296 and which is secured by means of a nut 298.

Figure 11:
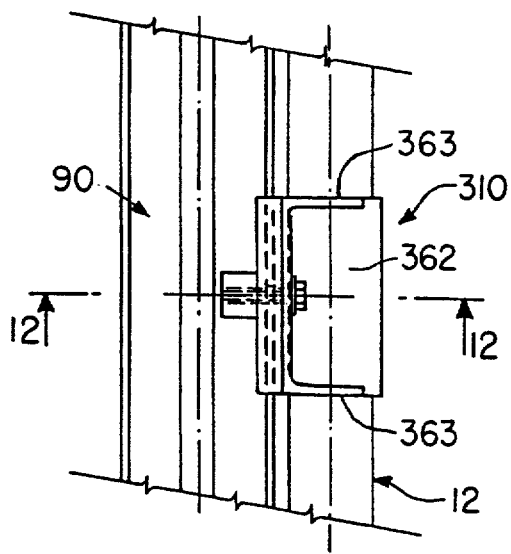
FIG. 11 is a top plan view showing a fastening device in yet another embodiment of the invention, applied to the fastening of a heat exchanger having a tubular header on a cross member of another heat exchanger.
Figure 12:
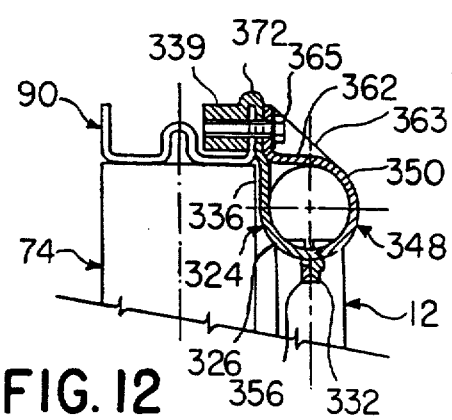
FIG. 12 is a view in cross section taken on the line XII—XII in FIG. 11.

In a fifth embodiment of the invention, shown in FIGS. 11 and 12, to which reference is now made, the heat exchanger 12 is again secured on the cross member 90 of the heat exchanger 74. In FIGS. 11 and 12, those elements which are common to those in FIGS. 1 to 4 are designated by the same reference numerals increased by 300.

Referring to FIGS. 11 and 12, the fastening device 310 here comprises a first fastening element 324 which has a concave central portion 326, two retaining lugs 332 and an extension 336. The second fastening element 348 has a central portion 350, a retaining lug 356 and an extension 362. By contrast with the embodiments previously described, the extensions 336 and 362 have neither gripping means similar to the gripping means 38 and 66, nor abutments analogous to the abutments 46 and 70. In the present embodiment, the retaining lug 356 and the retaining lugs 332 are arranged to fit within appropriate spaces which are formed in the tube bundle. As a result, the extensions 336 and 362 lie outside the tube bundle.

In this example, the extension 336 of the first fastening element 324 is extended by a lug 372 which is bent back in a U-shape and which carries an integral nut 339. This U-shaped, or double-bent, lug 372 is slotted over one of the projecting flanges 94 of the cross member 90. The extension 362 is bent at 90 degrees and reinforced by three generally triangular rib elements 363. A screw 365 passes successively through a hole formed in the extension 362, another formed in the U-shaped lug 372, and a further hole formed in the flange 94, before engaging in the nut 339.

In the various embodiments described above, at least two, and preferably four, fastening devices are used for securing the heat exchanger on to the support member. In all cases, the two elements that constitute the support member are preferably made by moulding in a high strength plastics material.

What is claimed is:

1. A heat exchanger comprising a heat exchanger, a support member, and a fastening device securing said heat exchanger on the support member, the heat exchanger comprising a bundle of tubes and a tubular header assembled with said tubes, the header defining a first peripheral region and a second peripheral region on opposite sides of the header, wherein the fastening device comprises: a first fastening element, defining a first concave central portion fitting over said first peripheral region of the header and having a first end defining a first retaining lug and a second end defining a first extension, said first fastening element further comprising first gripping means carried by said first extension; and a second fastening element, defining a second concave central portion fitting against said second peripheral region of the header and having a first end defining a second retaining lug and a second end defining a second extension, the second retaining lug having at least one aperture for receiving said first retaining lug of the first fastening element, the second fastening element further including second gripping means carried by said second extension, with the first and second gripping means cooperating with each other to bring said first and second extensions together; and a fastening lug integral with one of said fastening elements and securing the latter to said support member.

2. A heat exchanger assembly according to claim 1, wherein the fastening lug is an extension of the retaining lug of the second fastening element.

3. A heat exchanger assembly according to claim 2, wherein said support member defines a space for receiving said fastening lug, the latter being force-fitted in said space.

4. A heat exchanger assembly according to claim 1, wherein said fastening lug is joined to the second central portion and second extension of the second fastening element.

5. A heat exchanger assembly according to claim 4, further including another heat exchanger having a header, said support member being the header of said other heat exchanger and the fastening lug being integral with this header.

6. A heat exchanger assembly according to claim 2, further including another heat exchanger including a cross member, wherein the fastening lug is in the form of a cranked tongue defining a securing hole, the fastening device further including a screw and nut securing the fastening lug to the cross member through the hole in the former.

7. A heat exchanger assembly according to claim 1, wherein the gripping means comprise at least one boss depending from one of said first and second extensions of the fastening elements and defining a coaxial hole through the boss, and a screw passing through the other one of said extensions and engaged in said axial hole.

8. A heat exchanger assembly according to claim 1, wherein each of said first and second extensions has an inner face, said inner faces being in facing relationship to each other and defining at least one respective projecting abutment element inserted between adjacent tubes of the heat exchanger.

9. A heat exchanger assembly according to claim 1, where said first extension comprises a double-bent lug and a nut carried thereby, said support member having a flange fitting within the double-bent lug, said second extension being bent so as to define a cranked lug engaging against the double-bent lug, with the gripping means further including a screw passing successively through the cranked lug and the double-bent lug and cooperating with said nut.

10. A heat exchanger assembly according to claim 1, wherein said first retaining lug includes a boss.

11. A heat exchanger assembly according to claim 1, wherein each said fastening element is moulded in a plastics material.

* * * * *